United States Patent
Horie

(10) Patent No.: US 12,485,834 B2
(45) Date of Patent: Dec. 2, 2025

(54) RESIN-MOLDED ARTICLE

(71) Applicant: MORIROKU TECHNOLOGY COMPANY, LTD., Tokyo (JP)

(72) Inventor: Toshihiko Horie, Tokyo (JP)

(73) Assignee: MORIROKU CO., LTD., Tokyo (JP)

(*) Notice: Subject to any disclaimer, the term of this patent is extended or adjusted under 35 U.S.C. 154(b) by 242 days.

(21) Appl. No.: 18/299,812

(22) Filed: Apr. 13, 2023

(65) Prior Publication Data

US 2023/0373408 A1 Nov. 23, 2023

(30) Foreign Application Priority Data

May 18, 2022 (JP) .................................. 2022-081897

(51) Int. Cl.
*B60K 35/00* (2024.01)
*B60K 35/23* (2024.01)
*B60K 35/231* (2024.01)
*B60K 37/00* (2024.01)
*B60R 13/04* (2006.01)

(52) U.S. Cl.
CPC .................................. *B60R 13/04* (2013.01)

(58) Field of Classification Search
CPC ........ B60R 13/04; B60K 37/00; B60K 35/23; B60K 35/231; B60K 35/00
See application file for complete search history.

(56) References Cited

U.S. PATENT DOCUMENTS

| | | | |
|---|---|---|---|
| 10,739,592 B2* | 8/2020 | Boettcher | B60K 35/50 |
| 2015/0061313 A1 | 3/2015 | Watou et al. | |
| 2017/0052372 A1* | 2/2017 | Takahashi | B60K 35/22 |

FOREIGN PATENT DOCUMENTS

| | | |
|---|---|---|
| JP | H11-28730 A | 2/1999 |
| JP | 2000-177523 A | 6/2000 |
| JP | 2004-243594 A | 9/2004 |
| JP | 2005-313771 A | 11/2005 |
| JP | 2015-048029 A | 3/2015 |
| JP | 2020-40516 A | 3/2020 |
| JP | 2020-69839 A | 5/2020 |

* cited by examiner

*Primary Examiner* — Joanna Pleszczynska

(74) *Attorney, Agent, or Firm* — Rankin, Hill & Clark LLP

(57) ABSTRACT

A resin-molded article is fixed to and used on a plate-shaped member formed in a plate shape. The resin-molded article is such that an upper surface contact portion that is contactable with an upper surface of the plate-shaped member, an end surface contact portion that is contactable with an end surface of the plate-shaped member, and a lower surface contact portion that is formed separately from the end surface contact portion and that is contactable with a lower surface of the plate-shaped member are formed integrally with a body portion. It is preferable that an end portion contact surface of the end surface contact portion is disposed in substantially the same direction as the end surface of the plate-shaped member, the end portion contact surface being contactable with the end surface of the plate-shaped member.

8 Claims, 7 Drawing Sheets

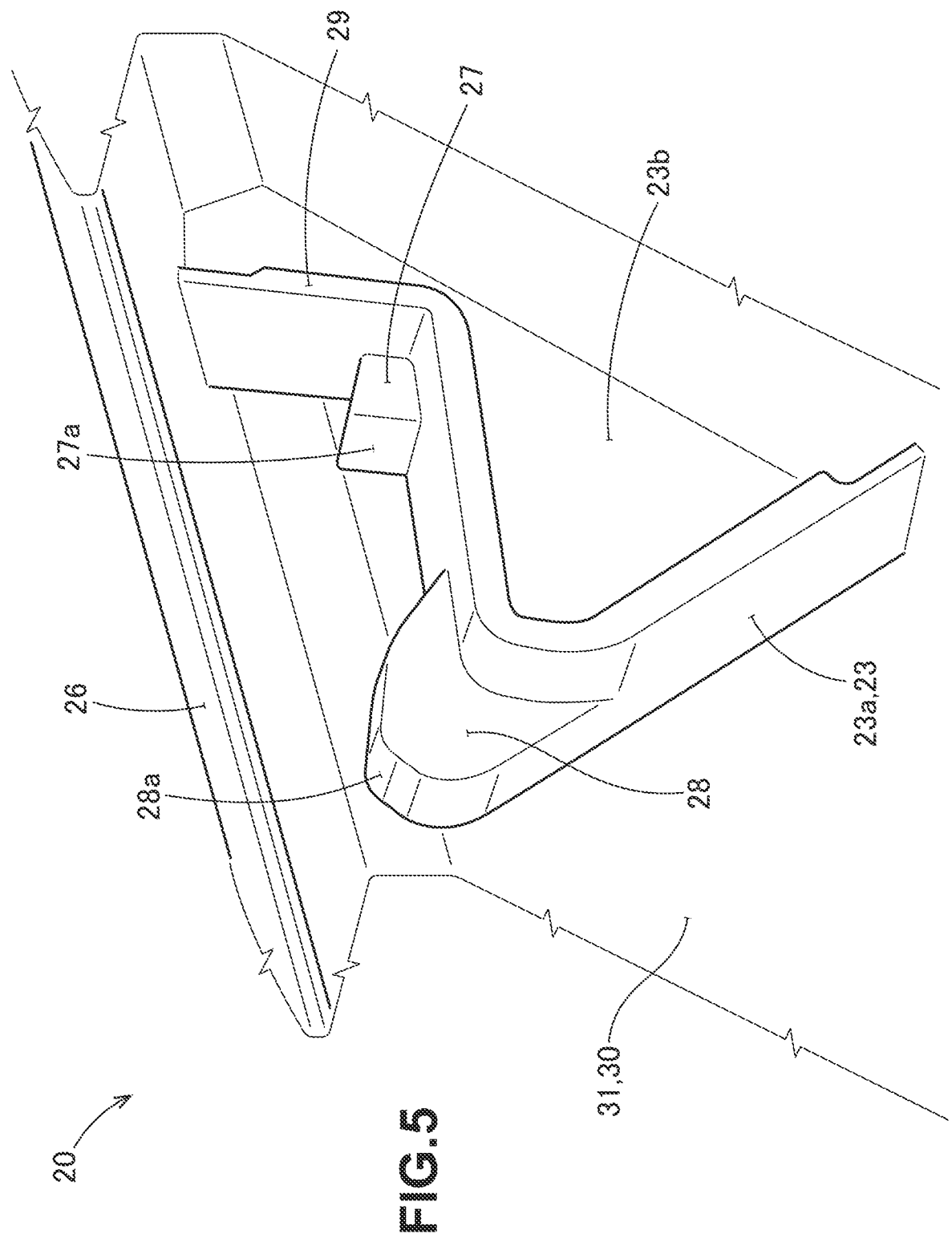

RESIN-MOLDED ARTICLE

FIELD OF THE INVENTION

The present invention relates to a resin-molded article that is fixed to and used on a plate-shaped member formed in a plate shape.

BACKGROUND

For example, in a vehicle on which a head-up display device is mounted, a resin-molded article may be fixed to and used on an instrument panel as a plate-shaped member. The resin-molded article is disposed above the head-up display device, and covers a part of an opening formed in the instrument panel.

The resin-molded article is not limited to a cover of the head-up display device, and various resin-molded articles that are fixed to and used on the plate-shaped member are known. As a technique relating to such a resin-molded article in the related art, there is a technique disclosed in Japanese Unexamined Patent Publication No. 2000-177523. The resin-molded article disclosed in Japanese Unexamined Patent Publication No. 2000-177523 will be described with reference to FIG. 7A of this application.

A resin-molded article 120 as a lid of an airbag device is fixed to and used on an instrument panel as a plate-shaped member 111. A front edge portion 140 that a front edge of the resin-molded article 120 is formed in a substantially U shape that is open toward the front. The resin-molded article 120 is fixed to the plate-shaped member 111 by sandwiching an end portion 111c of the plate-shaped member 111 with the front edge portion 140 formed in a substantially U shape.

SUMMARY

By the way, the position or size of the front edge portion 140 of the resin-molded article 120 is adjusted in a design stage such that the resin-molded article 120 can be fixed to the plate-shaped member 111 at an appropriate position.

Referring to FIG. 7B that is a view for describing a method for adjusting the front edge portion, when the resin-molded article 120 is designed, first, a manufacturing mold for the resin-molded article 120 is manufactured such that the front edge portion 140 is formed to be smaller than expected. Then, a location of the manufacturing mold is gradually cut such that the front edge portion 140 can be disposed at the appropriate location with respect to the plate-shaped member 111. The shape of the front edge portion 140 is changed by the amount of cut by cutting the manufacturing mold. Accordingly, until the portion where the front edge portion 140 comes into contact with the plate-shaped member 111 is changed and the resin-molded article 120 is fixed at the appropriate position, the adjustment is repeated.

At this time, a lower surface 141 of the front edge portion 140 is inclined with respect to the end portion 111c of the plate-shaped member 111. When the adjustment is performed to raise the lower surface 141 of the front edge portion 140, the position of the resin-molded article 120 is changed with respect to the plate-shaped member 111 in both a direction along a surface of the plate-shaped member 111 and a direction perpendicular to the surface. Even if the attachment position of the resin-molded article 120 becomes an optimum position in the direction along the surface of the plate-shaped member 111, it can happen that the attachment position does not become an optimum position in the direction perpendicular to the surface. It is desirable that the resin-molded article 120 can be fixed at the optimum position with respect to the plate-shaped member 111.

An object of the present disclosure is to provide a resin-molded article that can be fixed to a plate-shaped member at a desired position.

According to a first aspect of the present disclosure, there is provided a resin-molded article that is fixed to and used on a plate-shaped member formed in a plate shape, the article including: a body portion; an upper surface contact portion that is contactable with an upper surface of the plate-shaped member; an end surface contact portion that is contactable with an end surface of the plate-shaped member; and a lower surface contact portion that is formed separately from the end surface contact portion and that is contactable with a lower surface of the plate-shaped member. The upper surface contact portion, the end surface contact portion, and the lower surface contact portion are formed integrally with the body portion.

According to a second aspect, in the resin-molded article according to the first aspect, it is preferable that an end portion contact surface of the end surface contact portion is disposed in substantially the same direction as the end surface of the plate-shaped member, the end portion contact surface being contactable with the end surface of the plate-shaped member.

According to a third aspect, in the resin-molded article according to the second aspect, it is preferable that a lower portion contact surface of the lower surface contact portion is formed on a plane substantially perpendicular to the end portion contact surface, the lower portion contact surface being contactable with the lower surface of the plate-shaped member.

According to a fourth aspect, in the resin-molded article according to any one of the first to third aspects, it is preferable that the end surface contact portion is formed at a position covered by the upper surface contact portion, and that the lower surface contact portion is formed outside a region covered by the upper surface contact portion.

According to a fifth aspect, in the resin-molded article according to any one of the first to fourth aspects, it is preferable that a contact portion support portion protruding from the body portion along the plate-shaped member is further provided, and that the end surface contact portion and the lower surface contact portion are formed on an outer surface of the contact portion support portion.

According to a sixth aspect, in the resin-molded article according to any one of the first to fifth aspects, it is preferable that the upper surface contact portion connects the body portion to the upper surface of the plate-shaped member, and is inclined with respect to the body portion.

According to a seventh aspect, in the resin-molded article according to any one of the first to sixth aspects, it is preferable that an opening portion through which light emitted from below is transmittable is open in the body portion, and that the opening portion is surrounded by a peripheral wall extending in an up-down direction.

According to the present disclosure, it is possible to provide the resin-molded article that can be fixed to the plate-shaped member at a desired position.

BRIEF DESCRIPTION OF THE DRAWINGS

FIG. 5 is an enlarged view of a portion 5 of FIG. 2;

DETAILED DESCRIPTION OF THE PREFERRED EMBODIMENTS

Figure 1:
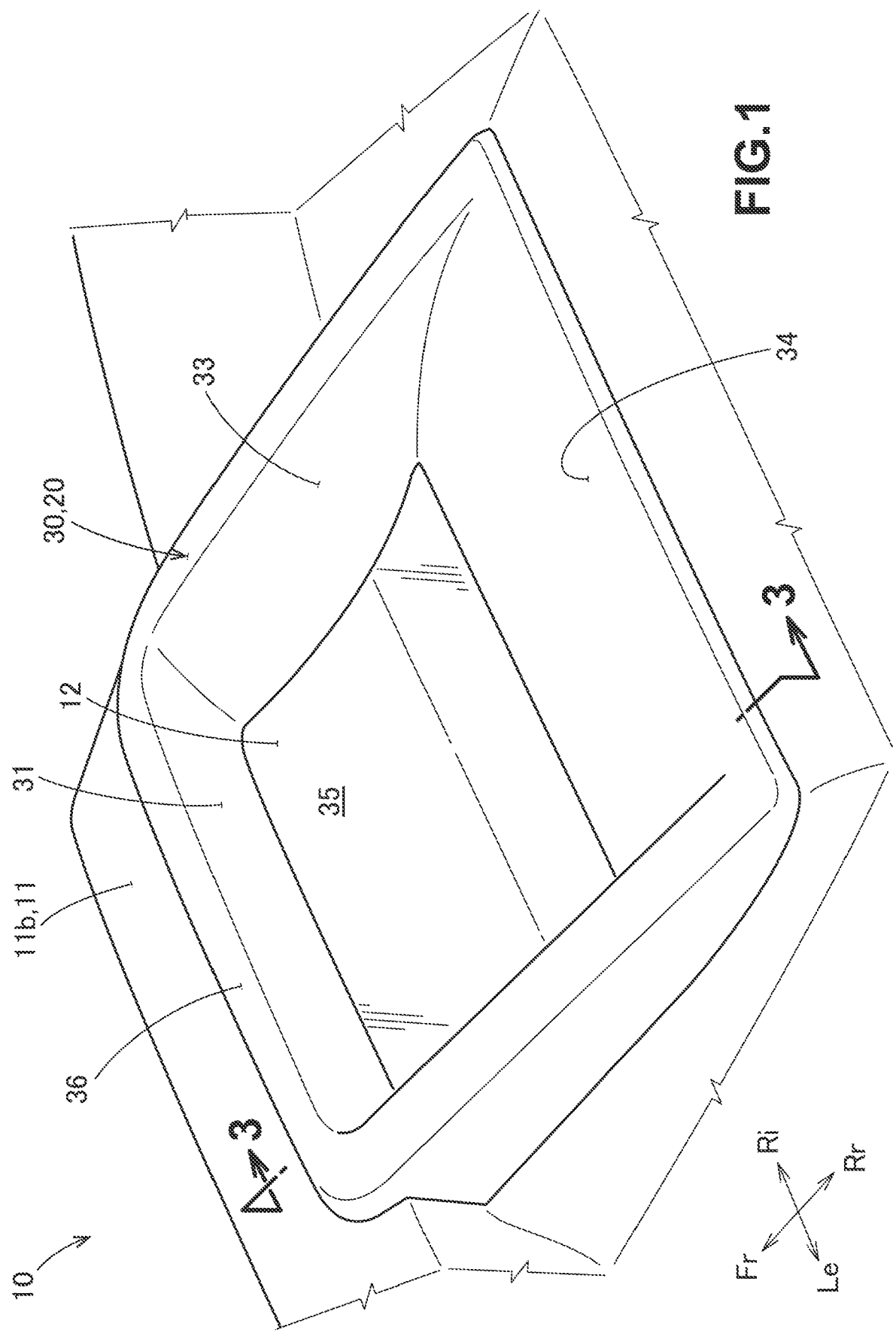
FIG. 1 is a perspective view illustrating a state where a resin-molded article according to an embodiment is fixed to a plate-shaped member.

An embodiment of the invention will be described below with reference to the accompanying drawings. Incidentally, in the description, left-right refers to left-right as a reference to an occupant of a vehicle on which a resin-molded article is mounted, and front-rear refers to front-rear as a reference to a traveling direction of the vehicle. In addition, in the drawings, Fr represents the front, Rr represents the rear, Le represents the left as viewed from the occupant, Ri represents the right as viewed from the occupant, Up represents the top or up, and Dn represents the bottom or down.

<Embodiment>

Hereinafter, an embodiment will be described with reference to the drawings.

Referring to FIG. 1, a resin-molded article 20 is, for example, mounted on a vehicle 10. More specifically, the resin-molded article 20 is fixed to and used on an instrument panel 11 provided in a front portion of a cabin. A head-up display device 12 capable of emitting light is provided below the resin-molded article 20.

The instrument panel 11 is a member made of resin and formed in a plate shape, and can also be referred to as the plate-shaped member 11. Incidentally, the plate-shaped member 11 may be any plate-shaped member capable of fixing the resin-molded article 20. For this reason, any material other than resin, such as metal, can be used as the material of the plate-shaped member.

Light emitted from the head-up display device 12 is, for example, projected onto a windshield. The occupant can obtain information such as speed of the vehicle by visually recognizing the light projected onto the windshield. Incidentally, the light emitted from the head-up display device 12 may be projected on a projection unit called a combiner.

Figure 2:
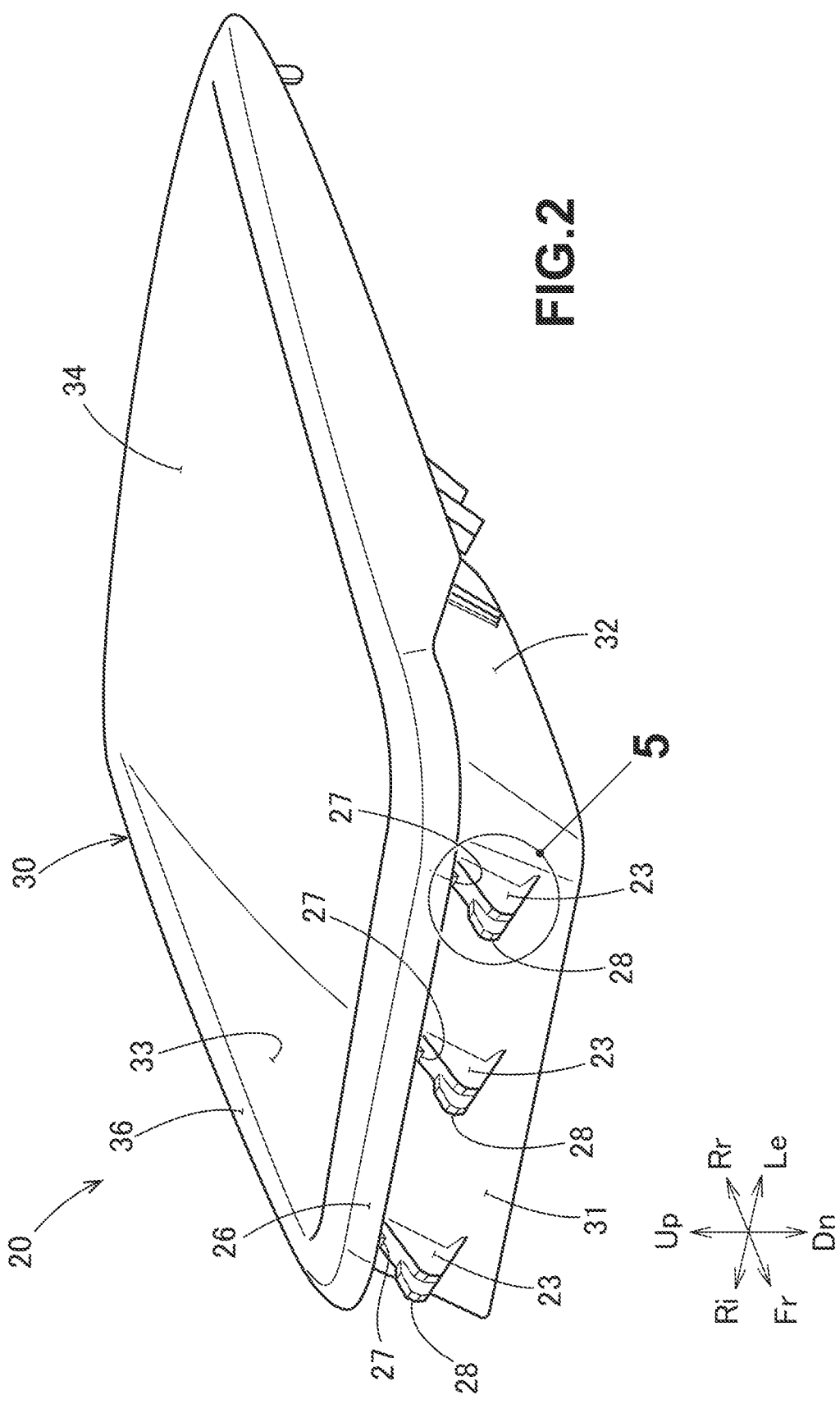
FIG. 2 is a perspective view of the resin-molded article illustrated in FIG. 1, as viewed from the front.
Figure 3:
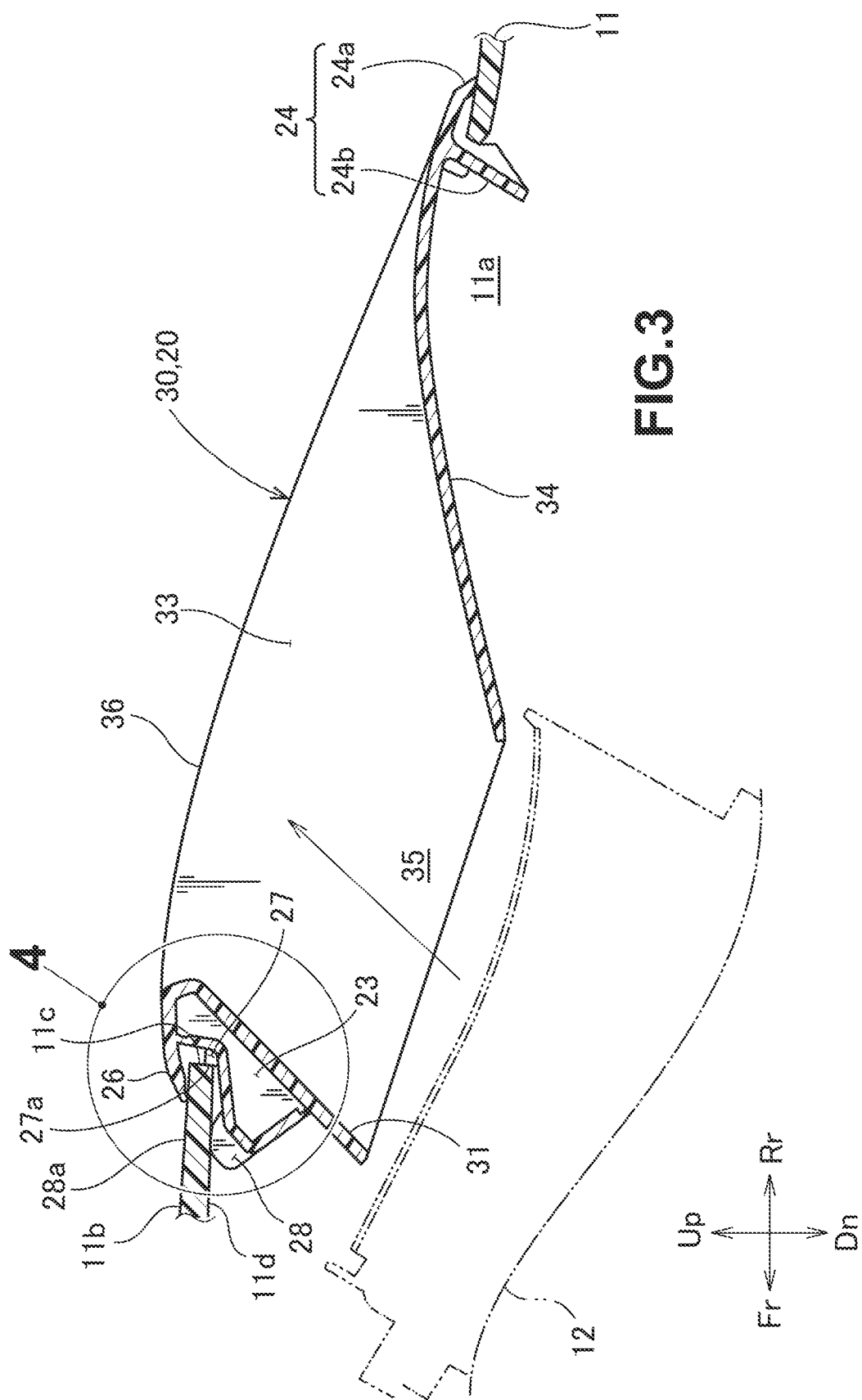
FIG. 3 is a cross-sectional view taken along line 3-3 of FIG. 1.

Referring to FIG. 2 and FIG. 3, the resin-molded article 20 is molded by injection molding. The resin-molded article 20 is fixed to an edge of a plate-shaped member opening portion 11a that is open in the plate-shaped member 11.

The resin-molded article 20 includes a body portion 30 formed in a substantially rectangular frame shape; a contact portion support portion 23 protruding from a front portion of the body portion 30 along the plate-shaped member 11; and a rear locking portion 24 that is formed in a rear portion of the body portion 30 and that is hooked on an edge of the plate-shaped member opening portion 11a.

Figure 4:
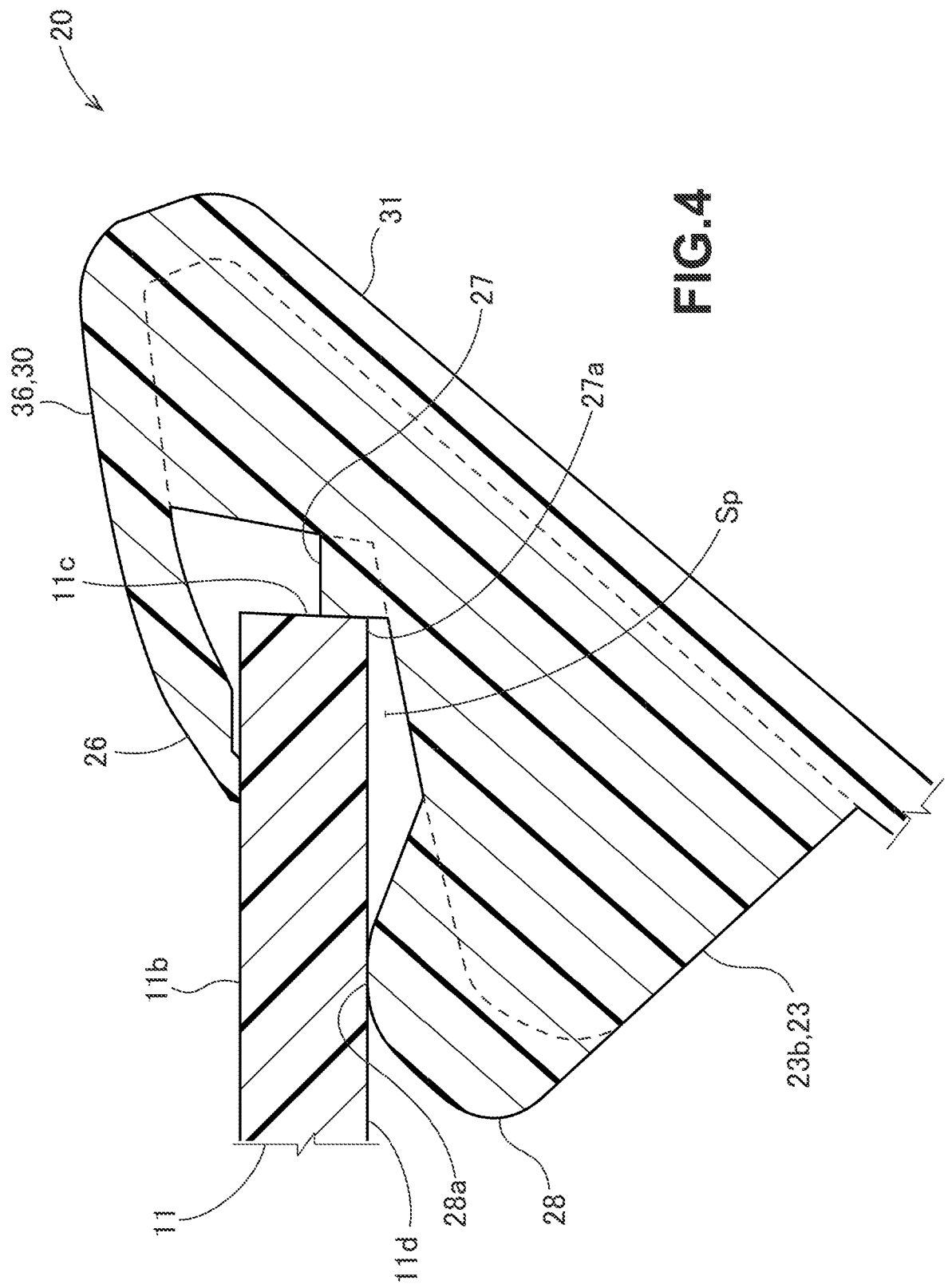
FIG. 4 is an enlarged view of a portion 4 of FIG. 3.

Referring to FIG. 4, the resin-molded article 20 further includes an upper surface contact portion 26 that extends from the body portion 30 to an upper surface 11b of the plate-shaped member 11 and that is contactable with the upper surface 11b of the plate-shaped member 11; an end surface contact portion 27 that protrudes upward from a rear portion of the contact portion support portion 23 and that is contactable with an end surface 11c of the plate-shaped member opening portion 11a; and a lower surface contact portion 28 that protrudes upward from a front end of the contact portion support portion 23 and that is contactable with a lower surface 11d of the plate-shaped member opening portion 11a.

Referring to FIG. 3 together, the body portion 30, the contact portion support portion 23, the rear locking portion 24, the upper surface contact portion 26, the end surface contact portion 27, and the lower surface contact portion 28 are integrally formed.

Referring to FIG. 2, the body portion 30 is such that four peripheral walls 31 to 34 are connected to each other in a substantially rectangular shape. The peripheral walls 31 to 34 are formed of a front wall 31 formed at a front portion of the body portion 30 and extending upward and downward; a left wall 32 extending rearward from a left end of the front wall 31; a right wall 33 extending rearward from a right end of the front wall 31; and a rear wall 34 extending leftward and rightward to connect rear ends of the left wall 32 and the right wall 33.

Lower ends of the peripheral walls 31 to 34 form an opening portion 35 through which light emitted from below is transmittable. Upper ends of the peripheral walls 31 to 34 form an upper surface portion 36 formed in a frame shape.

The front wall 31 has an oblong shape that is elongated leftward and rightward. The left wall 32 and the right wall 33 have a trapezoidal shape in which upper and lower sides are substantially parallel to each other. A rear side of the left wall 32 and a rear side of the right wall 33 are inclined such that the lower ends of the left wall 32 and the right wall 33 are located in front of the upper ends thereof. The rear wall 34 has a substantially oblong shape in a plan view. In addition, the rear wall 34 is formed with a downward slope toward the front, and a rear portion is curved upward from a central portion in a front-rear direction.

Referring to FIG. 2, three contact portion support portions 23 are intermittently formed in a left-right direction of the body portion 30. Referring to FIG. 4, a part of the contact portion support portion 23 is connected to a back surface of the body portion 30. A space Sp is formed between the contact portion support portion 23 and the upper surface contact portion 26. A part of the contact portion support portion 23 is located below the upper surface contact portion 26.

Referring to FIG. 5, the contact portion support portion 23 includes a support portion body 23a protruding forward from the body portion 30, and a side wall 23b that is raised from the body portion 30 and that closes one side surface of the support portion body 23a.

Referring to FIG. 3, the rear locking portion 24 includes a first rear contact portion 24a that extends along the upper surface 11b of the plate-shaped member 11 and that is in contact with the upper surface 11b of the plate-shaped member 11, and a second rear contact portion 24b that is in contact with the end surface 11c of the plate-shaped member opening portion 11a.

The first rear contact portion 24a is formed to be inclined with respect to the upper surface portion 36. Accordingly, an end surface of the first rear contact portion 24a comes into contact with the upper surface 11b of the plate-shaped member 11, and is invisible from the outside.

Referring to FIG. 4, the upper surface contact portion 26 connects the body portion 30 to the upper surface 11b of the plate-shaped member 11, and is inclined with respect to both the body portion 30 and the upper surface 11b of the plate-shaped member 11. An end surface of the upper surface contact portion 26 comes into contact with the upper surface 11b of the plate-shaped member 11, and is invisible from the outside.

A tip of the upper surface contact portion 26 is formed thin, and a portion formed thin comes into contact with the upper surface 11b of the plate-shaped member 11.

The end surface contact portion 27 is formed at a position covered by the body portion 30 and/or the upper surface contact portion 26. The end surface contact portion 27 includes an end portion contact surface 27a that is contactable with the end surface 11c of the plate-shaped member 11. The end portion contact surface 27a is formed along the end surface 11c of the plate-shaped member 11. Namely, the end portion contact surface 27a is disposed in substantially the same direction as the end surface 11c of the plate-shaped member 11. It is preferable that the end portion contact surface 27a is in line contact or surface contact with the end surface 11c of the plate-shaped member 11.

The end surface contact portion 27 is formed at a position overlapping the side wall 23b of the contact portion support portion 23. The end surface contact portion 27 is formed flush with the side wall 23b.

The position of the end portion contact surface 27a can be adjusted by cutting a mold. The end portion contact surface 27a can be located further forward by cutting the mold. The position in the front-rear direction of the resin-molded article 20 can be adjusted by adjusting the position of the end portion contact surface 27a.

The lower surface contact portion 28 is formed outside a region covered by the upper surface contact portion 26, and is separated from the end surface contact portion 27. The lower surface contact portion 28 includes a lower portion contact surface 28a that is contactable with the lower surface 11d of the plate-shaped member 11. The lower portion contact surface 28a is formed on a plane substantially perpendicular to the end portion contact surface 27a. The lower portion contact surface 28a is formed at the highest position in the lower surface contact portion 28.

The lower surface contact portion 28 is formed at a position overlapping the side wall 23b of the contact portion support portion 23. The lower surface contact portion 28 is formed flush with the side wall 23b.

The position of the lower portion contact surface 28a can be adjusted by cutting the mold. The lower portion contact surface 28a can be located higher by cutting the mold. The position in an up-down direction of the resin-molded article 20 can be adjusted by adjusting the position of the lower portion contact surface 28a.

Incidentally, the end surface contact portion 27 and the lower surface contact portion 28 may directly protrude from the body portion 30 without the contact portion support portion 23 interposed therebetween.

Next, a method for attaching the resin-molded article 20 described above to the plate-shaped member 11 will be described.

Figure 6A:
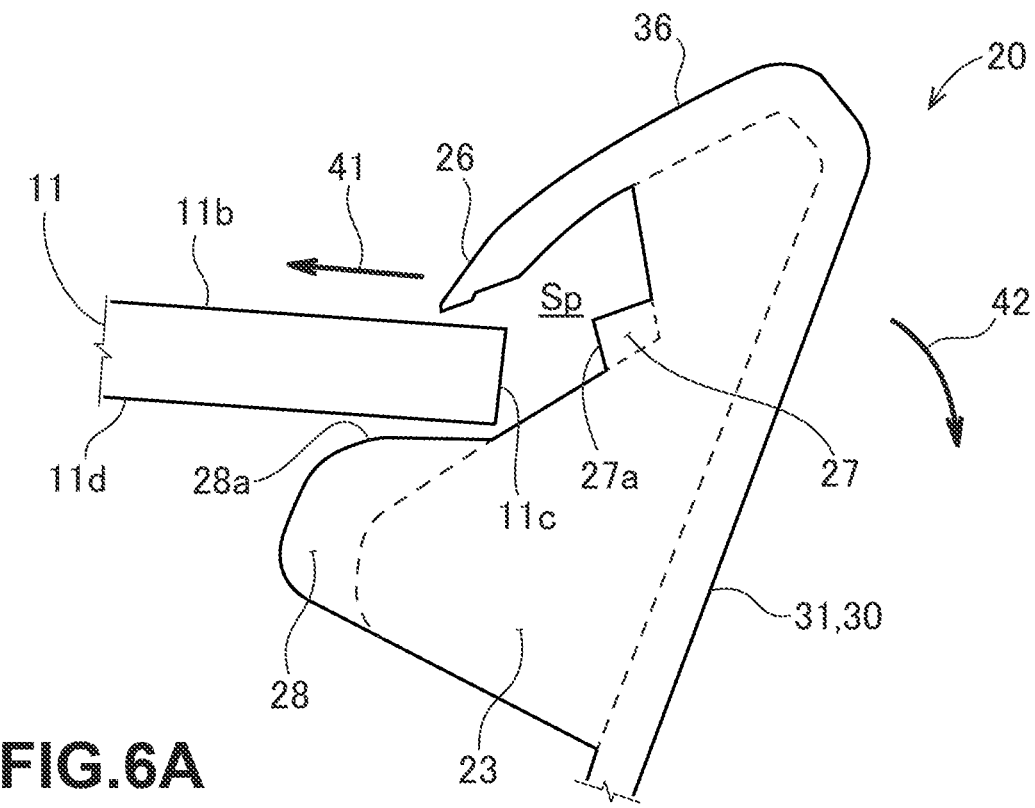
FIG. 6A is a view for describing a step of facing the resin-molded article toward the plate-shaped member.
Figure 6B:
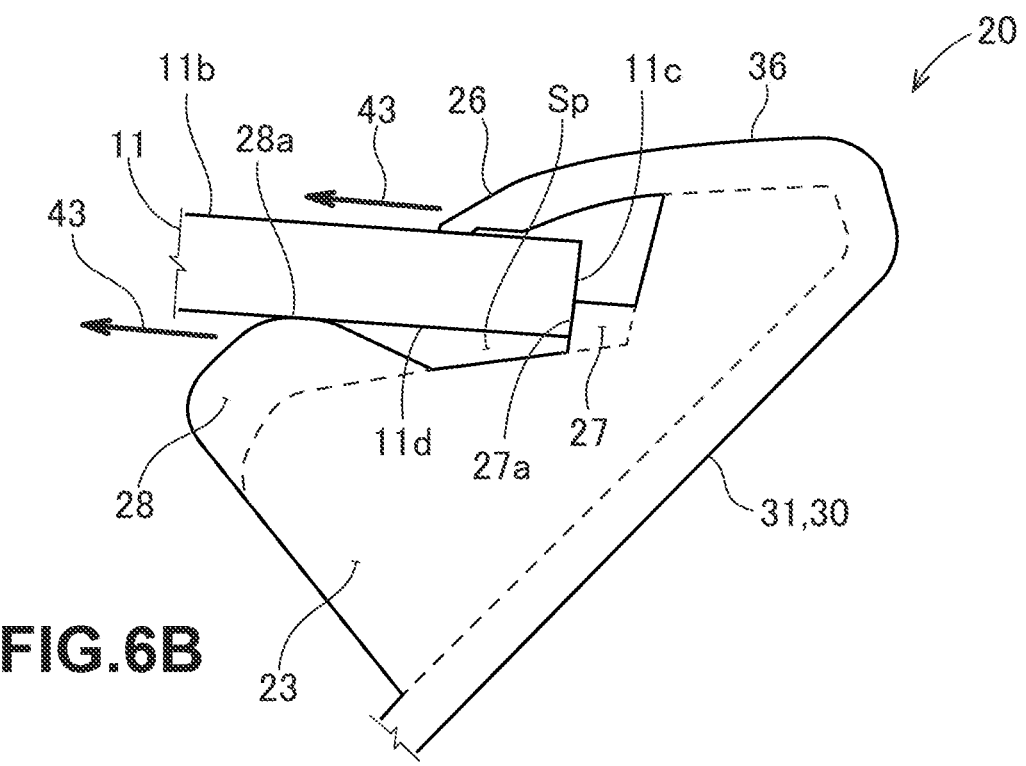
FIG. 6B is a view for describing a step of fixing the resin-molded article faced toward the plate-shaped member, to the plate-shaped member.
Figure 7A:
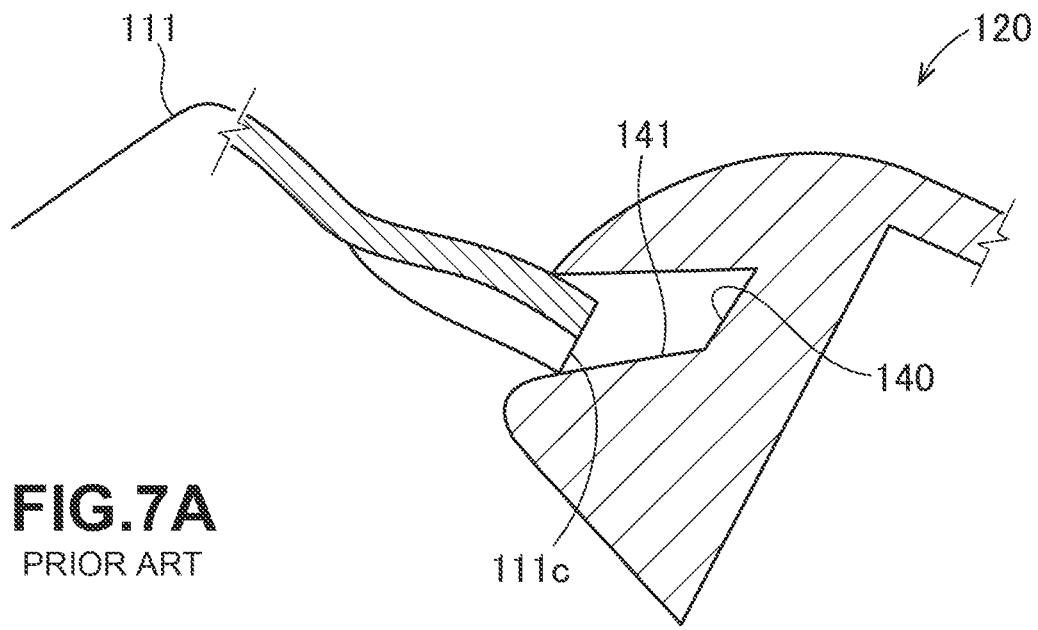
FIG. 7A is a view for describing a resin-molded article in the related art.
Figure 7B:
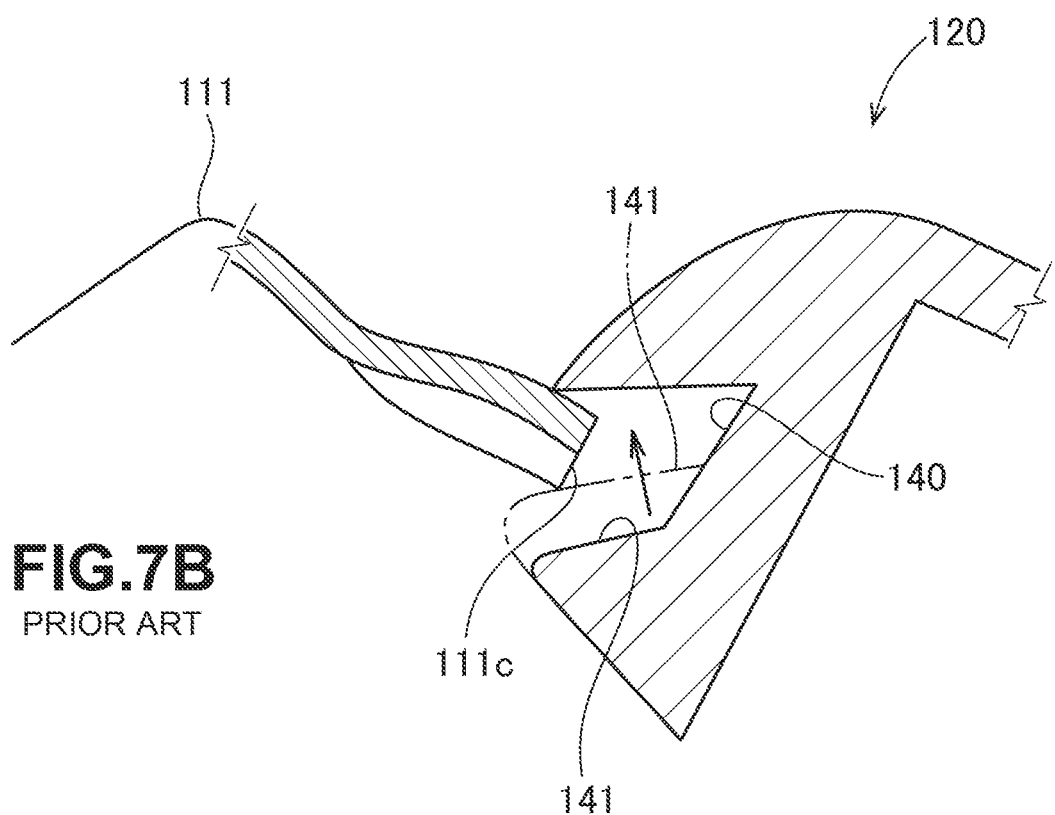
FIG. 7B is a view for describing problems with the resin-molded article in the related art.

Referring to FIG. 6A and FIG. 6B, first, as indicated by arrow 41, the space Sp between the upper surface contact portion 26 and the contact portion support portion 23 is faced toward the end surface 11c of the plate-shaped member 11. After the space Sp is faced, as indicated by arrow 42 and arrow 43, the upper surface contact portion 26 is brought into contact with the upper surface 11b of the plate-shaped member 11 by rotating the resin-molded article 20 while sliding the resin-molded article 20 forward, and the resin-molded article 20 is slid forward until the end portion contact surface 27a comes into contact with the end surface 11c of the plate-shaped member 11. At this time, by pushing the rear locking portion 24 (refer to FIG. 3) downward, a rear portion of the resin-molded article 20 is fixed and the lower surface contact portion 28 comes into contact with the lower surface 11d of the plate-shaped member 11. The resin-molded article 20 can be fixed to the plate-shaped member 11 at an accurate position by bringing the upper surface contact portion 26, the end surface contact portion 27, and the lower surface contact portion 28 into contact with the plate-shaped member 11.

The resin-molded article 20 described above will be summarized.

Referring to FIG. 4, the resin-molded article 20 is fixed to and used on the plate-shaped member 11 formed in a plate shape. In addition, the resin-molded article 20 is such that the upper surface contact portion 26 which is contactable with the upper surface 11b of the plate-shaped member 11, the end surface contact portion 27 which is contactable with the end surface 11c of the plate-shaped member 11, and the lower surface contact portion 28 which is formed separately from the end surface contact portion 27 and which is contactable with the lower surface 11d of the plate-shaped member 11 are formed integrally with the body portion 30.

The resin-molded article 20 includes the end surface contact portion 27 that is contactable with the end surface 11c of the plate-shaped member 11, and the lower surface contact portion 28 that is formed separately from the end surface contact portion 27 and that is contactable with the lower surface 11d of the plate-shaped member 11. The end surface contact portion 27 that comes into contact with the end surface 11c of the plate-shaped member 11 and the lower surface contact portion 28 that comes into contact with the lower surface 11d are separately formed. For this reason, the resin-molded article 20 can be fixed to each of the end surface 11c and the lower surface 11d of the plate-shaped member 11 at an optimum position. Namely, it is possible to provide the resin-molded article 20 that can be fixed to the plate-shaped member 11 at a desired position.

The end portion contact surface 27a of the end surface contact portion 27 is disposed in substantially the same direction as the end surface 11c of the plate-shaped member 11, the end portion contact surface 27a being contactable with the end surface 11c of the plate-shaped member 11. A wide contactable surface can be ensured, and the resin-molded article 20 can be reliably fixed at the desired position.

The lower portion contact surface 28a of the lower surface contact portion 28 is formed on the plane substantially perpendicular to the end portion contact surface 27a, the lower portion contact surface 28a being contactable with the lower surface 11d of the plate-shaped member 11. Accordingly, the lower portion contact surface 28a and the lower surface 11d of the plate-shaped member 11 can also be brought into line contact with each other. The resin-molded article 20 can be more reliably fixed at the desired position.

The end surface contact portion 27 is formed at a position covered by the upper surface contact portion 26. In addition, the lower surface contact portion 28 is formed outside a region covered by the upper surface contact portion 26. By forming the end surface contact portion 27 at the position covered by the upper surface contact portion, the end surface contact portion 27 is not exposed to the outside, so that the resin-molded article 20 can be made to have a good appearance. In addition, by forming the lower surface contact portion 28 outside the region covered by the upper surface contact portion 26, a large space Sp can be ensured, and the work of attaching the resin-molded article 20 to the plate-shaped member 11 becomes easy. Incidentally, since the lower surface contact portion 28 is a portion that comes into contact with the lower surface 11d of the plate-shaped member 11, and the lower surface contact portion 28 is covered by the plate-shaped member 11, even if the lower surface contact portion 28 is formed outside the region covered by the upper surface contact portion 26, aesthetics does not deteriorate.

The contact portion support portion 23 protruding from the body portion 30 along the plate-shaped member 11 is further provided. In addition, the end surface contact portion 27 and the lower surface contact portion 28 are formed on an outer surface of the contact portion support portion 23. By forming the contact portion support portion 23, the support rigidity of the end surface contact portion 27 and the lower surface contact portion 28 can be increased, and it will be sufficient if the end surface contact portion 27 and the lower surface contact portion 28 are formed small. By making the end surface contact portion 27 and the lower surface contact portion 28 small, the adjustment work also becomes easy, and the manufacturing cost of the resin-molded article 20 can be made inexpensive.

The upper surface contact portion 26 connects the body portion 30 to the upper surface 11b of the plate-shaped member 11, and is inclined with respect to the body portion 30. An end portion of the upper surface contact portion 26 can be made invisible from the outside, and the degree of freedom in design can be improved while further improving the aesthetics of the resin-molded article 20.

Referring to FIG. 3, the opening portion 35 through which light emitted from below is transmittable is open in the body portion 30. In addition, the opening portion 35 is surrounded by the peripheral walls 31 to 34 extending in the up-down direction. When emitted light is transmitted, it is particularly desirable to dispose the resin-molded article 20 at an accurate position with respect to a device that emits the light (for example, head-up display device 12). The resin-molded article 20 can be fixed to the plate-shaped member 11 at the desired position, and is particularly preferable as a resin-molded article that transmits emitted light.

Referring to FIG. 4, the end surface contact portion 27 and the lower surface contact portion 28 are formed flush with the side wall 23b. Accordingly, the shapes of the end surface contact portion 27 and the lower surface contact portion 28 are easily adjusted.

Incidentally, the place where the resin-molded article is mounted is not limited to within the cabin as long as the resin-molded article is fixed to and used on the plate-shaped member. Namely, the resin-molded article can be mounted on other conveyances other than the vehicle or on construction machines. Further, the resin-molded article can also be used for a house or the like. In addition, the resin-molded article is not limited to being able to transmit light. For example, the resin-molded article can also be used as a lid of an airbag device. The invention is not limited to the embodiment as long as the actions and effects of the invention are exhibited.

What is claimed is:

1. An assembly comprising a resin-molded article and a plate-shaped member that is formed in a plate shape, the resin-molded article being fixed to the plate-shaped member, the plate-shaped member having an upper surface, a lower surface, and an end surface, wherein the resin-molded article comprises:
   a body portion;
   an upper surface contact portion that is contactable with the upper surface of the plate-shaped member;
   an end surface contact portion that is contactable with the end surface of the plate-shaped member; and
   a lower surface contact portion that is formed separately from the end surface contact portion and that is contactable with the lower surface of the plate-shaped member,
   wherein the upper surface contact portion, the end surface contact portion, and the lower surface contact portion are formed integrally with the body portion.

2. The assembly according to claim 1,
   wherein an end portion contact surface of the end surface contact portion and the end surface of the plate-shaped member are substantially parallel to one another, the end portion contact surface being contactable with the end surface of the plate-shaped member.

3. The assembly according to claim 2,
   wherein a lower portion contact surface of the lower surface contact portion is formed on a plane substantially perpendicular to the end portion contact surface, the lower portion contact surface being contactable with the lower surface of the plate-shaped member.

4. The assembly according to claim 1,
   wherein the end surface contact portion is formed at a position covered by the upper surface contact portion, and
   the lower surface contact portion is formed outside a region covered by the upper surface contact portion.

5. The assembly according to claim 1,
   wherein a contact portion support portion protruding from the body portion along the plate-shaped member is further provided, and
   the end surface contact portion and the lower surface contact portion are formed on an outer surface of the contact portion support portion.

6. The assembly according to claim 1,
   wherein the upper surface contact portion connects the body portion to the upper surface of the plate-shaped member, and is inclined with respect to the body portion.

7. The assembly according to claim 1,
   wherein the body portion defines an opening portion through which light emitted from below is transmittable, and
   the opening portion is surrounded by a peripheral wall extending in an up-down direction.

8. The assembly according to claim 1,
   wherein the lower surface contact portion and the end surface contact portion are formed at a distance from each other, leaving a gap for the end face of the plate member to come into it when the resin-molded article is mounted on the plate member.

* * * * *